United States Patent
Murai et al.

(10) Patent No.: US 6,472,105 B2
(45) Date of Patent: *Oct. 29, 2002

(54) BONDING AGENT FOR CELLS AND CELL USING THE SAME

(75) Inventors: Michio Murai, Tokyo (JP); Takayuki Inuzuka, Tokyo (JP); Yasuhiro Yoshida, Tokyo (JP); Shigeru Aihara, Tokyo (JP); Daigo Takemura, Tokyo (JP); Hisashi Shiota, Tokyo (JP); Jun Aragane, Tokyo (JP); Hiroaki Urushibata, Tokyo (JP); Kouji Hamano, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,668

(22) PCT Filed: Nov. 19, 1997

(86) PCT No.: PCT/JP97/04202

§ 371 (c)(1),
(2), (4) Date: Jul. 19, 1999

(87) PCT Pub. No.: WO99/26308

PCT Pub. Date: May 27, 1999

(65) Prior Publication Data

US 2002/0048704 A1 Apr. 25, 2002

(51) Int. Cl.[7] .......................... H01M 10/40; H01M 2/16

(52) U.S. Cl. ................ 429/306; 429/317; 429/245; 524/265

(58) Field of Search ................. 429/317, 306, 429/233, 245, 209; 524/265

(56) References Cited

U.S. PATENT DOCUMENTS

| | | | | |
|---|---|---|---|---|
| 5,437,692 A | * | 8/1995 | Dasgupta et al. |
| 5,635,312 A | * | 6/1997 | Yanagisawa et al. |
| 5,741,609 A | * | 4/1998 | Chen et al. |
| 5,989,689 A | * | 11/1999 | Komatsu |
| 6,306,540 B1 | | 10/2001 | Hiroi et al. |
| 6,322,599 B1 | | 11/2001 | Hamano et al. |

* cited by examiner

*Primary Examiner*—John S. Maples
(74) *Attorney, Agent, or Firm*—Oblon, Spivak, McClelland, Maier & Neustadt, P.C.

(57) ABSTRACT

An adhesive for batteries. The adhesive has improved wetting properties, improved adhesive strength and prevents deterioration of battery performance. Secondary batteries can be obtained having an arbitrary shape such as a thin shape with high reliability and high charge and discharge efficiency. The adhesive includes a thermoplastic resin, a solvent capable of dissolving the resin and a neutral and aprotic surfactant. The surfactant includes a polysiloxene skeleton. The adhesive is used in batteries for adhering an active material layer joined to a current collector to a separator.

8 Claims, 2 Drawing Sheets

BONDING AGENT FOR CELLS AND CELL USING THE SAME

BACKGROUND OF THE INVENTION

1. Field of the Invention

This invention relates to secondary batteries used in, for example, portable electronic equipment. More particularly, it relates to batteries that can take an arbitrary shape, such as a thin shape, and an adhesive used therein.

2. Discussion of the Background

There has been an eager demand for reduction in size and weight of portable electronic equipment, and improvement of battery performance and battery size reduction are indispensable for the realization. To meet the demand, development and improvement of batteries from various aspects have been proceeding. Characteristics required of batteries include high voltage, high energy density, reliability, and freedom of shape design. Of available batteries, lithium ion batteries are secondary batteries that are the most expected to achieve a high voltage and a high energy density and will undergo successive improvements.

A lithium ion secondary battery mainly comprises a positive electrode, a negative electrode, and an ion conducting layer interposed between the electrodes. The lithium ion secondary batteries that have been put to practical use employ a positive plate prepared by applying powder of lithium-cobalt oxide, etc. as an active material to a current collector and a negative plate similarly prepared by applying powder of a carbonaceous material as an active material to a current collector, with a separator, as an ion conducting layer, made of a porous film of polyethylene, polypropylene, etc. and filled with a nonaqueous electrolytic solution being interposed therebetween.

In order to maintain electrical contacts among a positive electrode, a separator and a negative electrode, it is necessary in a conventional lithium ion secondary battery to externally apply pressure by means of a firm battery case made of metal, etc. to maintain all the planar contacts as described in JP-A-8-83608.

JP-A-5-159802 discloses a solid secondary battery, in which an ion conducting solid electrolyte layer and an electrode material layer are heat bonded with a thermoplastic resin binder to make an integral battery body. In this case, since the electrodes and the electrolyte layer are united into an integral body to maintain electrical contacts, the function as a battery is performed without external pressure application. With reference to thin type batteries, those using polymer gel as an ion conductor are known as described in U.S. Pat. No. 5,460,904. The disclosed thin type batteries are characterized in that polyvinylidene fluoride and a hexafluoropropene copolymer are used as polymer gel to join a positive electrode, a separator, and a negative electrode into an integral body.

Conventional batteries being thus constituted, a firm battery case that imposes external pressure to the electrode layer and the electrolyte layer must be used so as to bring them into sufficient electrical contact. As a result, the case which does not participate in electricity generation has a large proportion in the total volume or weight of a battery, which is disadvantageous for production of batteries having a high energy density.

In those batteries in which an electrode layer and a solid electrolyte layer are joined via a binder, the electrode-electrolyte interface is covered with a solid binder, which is disadvantageous from the standpoint of electrical conductivity through the electrode-electrolyte interface as compared with, for example, the above-mentioned type of batteries in which a liquid electrolyte is used and external pressure is applied by means of a battery case. Where a binder is used, on the other hand, no binders equal to a liquid electrolyte in electrical conductivity has been developed as yet, failing to secure equality in electrical conductivity to a battery using a liquid electrolyte.

Further, the thin type batteries using polymer gel fail to have equality in charge and discharge characteristics to those using a liquid electrolyte because there is no gel electrolyte generally known to be equal or superior to a liquid electrolyte in electrical conductivity.

SUMMARY OF THE INVENTION

The present invention has been completed in order to solve the above-described problems. Accordingly, an object of the invention is to provide an adhesive with which an electrode layer and an electrolyte layer are joined to establish a satisfactory electrical contact through the electrode-electrolyte layers without using a firm case for external pressure application; and to efficiently produce a thin, light and highly reliable battery with excellent charge and discharge characteristics by using the adhesive.

A first adhesive for batteries according to the present invention is an adhesive for batteries used for adhering an active material layer joined to a current collector to a separator, which comprises a thermoplastic resin, a solvent capable of dissolving the thermoplastic resin, and a neutral and aprotic surface active agent. A solution of the adhesive exhibits improved wetting to bring improved adhesive strength so that deterioration in battery performance can be prevented, and productivity of batteries can be improved. Accordingly, secondary batteries which can take any arbitrary shape, such as a thin shape, secure reliability, and exhibit high charge and discharge efficiency can be produced.

A second adhesive for batteries according to the invention is the above-described first adhesive for batteries, in which the surface-active agent has a polysiloxane skeleton in the molecule thereof. In this aspect the battery performance is further improved, and the workability is improved.

A first battery according to the invention has an electrode laminate composed of a couple of electrodes each having an active material layer bonded to a current collector and a separator sandwiched therebetween and adhered to the active material layer of each electrode with an adhesive comprising a thermoplastic resin, a solvent capable of dissolving the thermoplastic resin, and a neutral and aprotic surface active agent. In this aspect, practical secondary batteries which can take any arbitrary shape, such as a thin shape, secure reliability, and exhibit high charge and discharge efficiency can be obtained.

A second battery according to the invention is the above-described first battery which has a plurality of the electrode laminates. A battery having a multilayer structure and a so increased capacity can be obtained while being compact, securing reliability, and exhibiting high charge and discharge efficiency.

A third battery according to the invention is the above-described second battery, wherein the plurality of electrode laminates are formed by interposing a positive electrode and a negative electrode alternately among a plurality of cut sheets of the separator.

A fourth battery according to the invention is the above-described second battery, wherein the plurality of electrode laminates are formed by interposing a positive electrode and a negative electrode alternately between rolled separators.

A fifth battery according to the invention is the above-described second battery, wherein the plurality of electrode laminates are formed by interposing a positive electrode and a negative electrode alternately between folded separators.

DETAILED DESCRIPTION OF THE PREFERRED EMBODIMENTS

The inventors have extensively investigated on a favorable method for adhering a separator to each active material layer of a couple of electrodes comprising an active material layer joined to a current collector and, as a result, reached the present invention.

Figure 1:
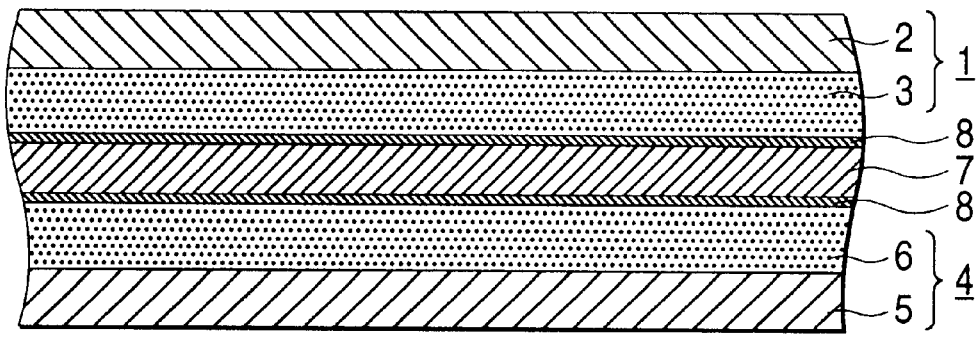
FIG. 1 is a schematic cross section showing the main part of the battery according to a first example of the present invention.

The present invention relates to an adhesive 8 used in manufacture of batteries which comprise, as shown in FIG. 1, a positive electrode 1 having a positive electrode active material layer 3 adhered to a positive electrode current collector 2, a negative electrode 4 having a negative electrode active material layer 6 adhered to a negative electrode current collector 5, an a separator 7 holding an electrolytic solution, the adhesive 8 being used to join the positive electrode 1 and the negative electrode 4 to the separator 7.

The characteristic of the invention resides in the composition of the adhesive 8 adhering the electrodes 1 and 4 to the separator. The adhesive 8 is characterized by containing a thermoplastic resin, a solvent capable of dissolving the thermoplastic resin and a neutral and aprotic surface-active agent.

The inventors have conducted extensive studies on how to reduce the thickness of a secondary battery while retaining reliability and increasing charge and discharge efficiency. As a result, they have found that a secondary battery that can take an arbitrary shape, such as a thin shape, and yet secures reliability and exhibits high charge and discharge efficiency can be obtained by using, as an adhesive 8, a composition comprising a thermoplastic resin, a solvent capable of dissolving the thermoplastic resin, and a neutral and aprotic surface active agent and completed the present invention.

According to the inventors' study, a solution comprising a thermoplastic resin and a solvent capable of dissolving the thermoplastic resin and having added thereto a surface active agent has improved wetting properties and can be smoothly and uniformly applied as an adhesive 8 on a separator. It is considered therefore that adhesive strength enough to produce an integral battery body is exerted even with a small content of the thermoplastic resin, which has smaller ion conductivity than a liquid electrolyte, in the adhesive.

The thermoplastic resins which can be used include polyvinylidene fluoride, polyvinyl alcohol, and mixtures thereof.

Any solvent is useful for dissolving the thermoplastic resin as far as it is capable of dissolving the thermoplastic resin. Useful solvents include N-methyl-2-pyrrolidone, N,N-dimethylformamide, N,N-dimethylacetamide, γ-butyrolactone, and mixed solvents containing one or more of these compounds.

The surface-active agents which can be used are neutral and aprotic ones. Those having a polysiloxane structure in the molecular skeleton thereof are especially preferred for battery performance obtained and their availability and convenience of handling. In particular, those reactive with water, such as polymethoxypolysiloxane, not only act as a surface active agent but are expected to bring about improved battery characteristics and long-term reliability because they would react with moisture which may have been present in the members constituting the battery or may have entered the inside of the battery after assembly to remove the water content in the battery.

In some cases, it is possible to add fillers, such as inorganic oxides, to the adhesive solution. In this case it is expected that the surface-active agent contained in the adhesive will facilitate uniform dispersion of the filler in the adhesive solution because of its general character. The filler added will make the adhesive layer porous, forming more voids through which ions are conducted, so that the battery performance will be improved further.

Any separator made of an electrically insulating material that has sufficient strength, such as porous film, net, and nonwoven fabric, can be used. While not limiting, a single layer or multilayer porous film of polyethylene or polypropylene is preferred for battery performance obtained.

Figure 2:
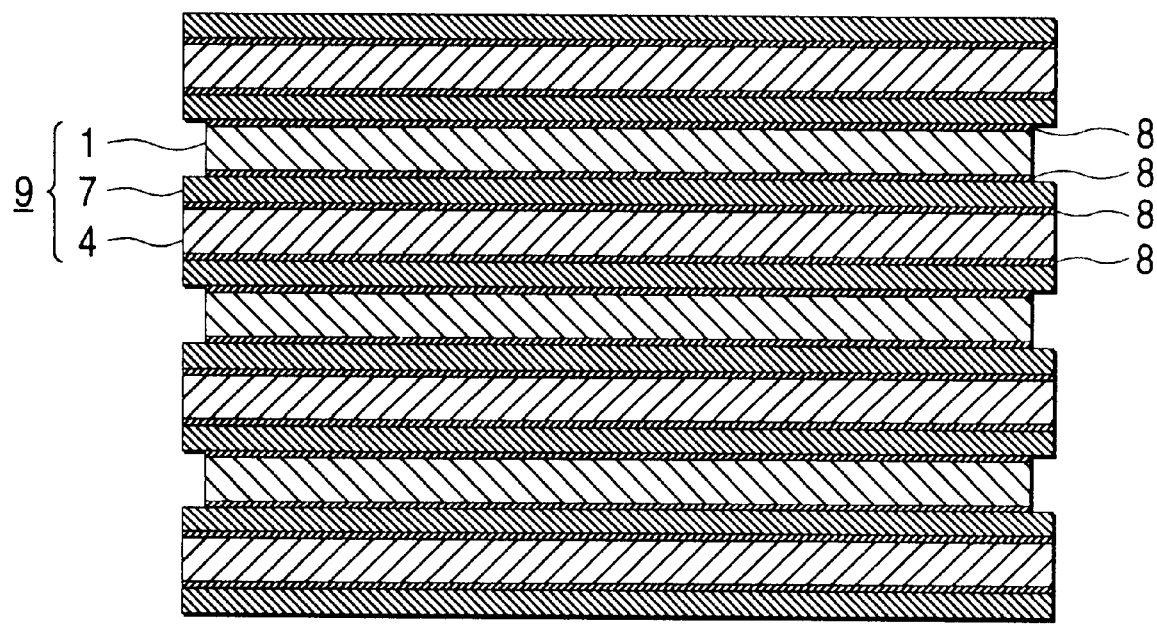
FIG. 2 is a schematic cross section showing the main part of the battery according. to a second example of the present invention.
Figure 3:
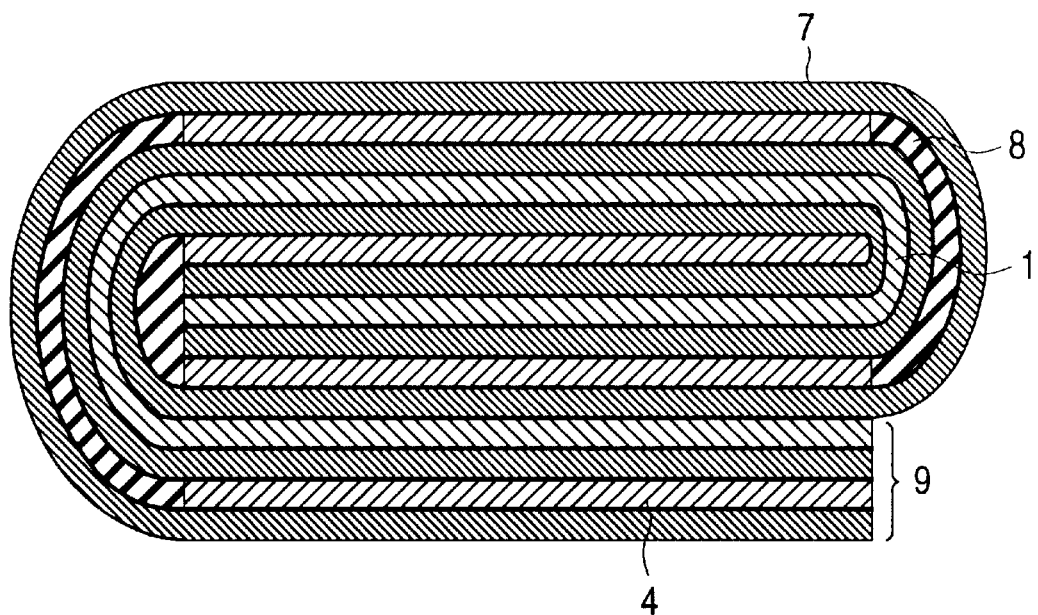
FIG. 3 is a schematic cross section showing the main part of the battery according to a third example of the present invention.
Figure 4:
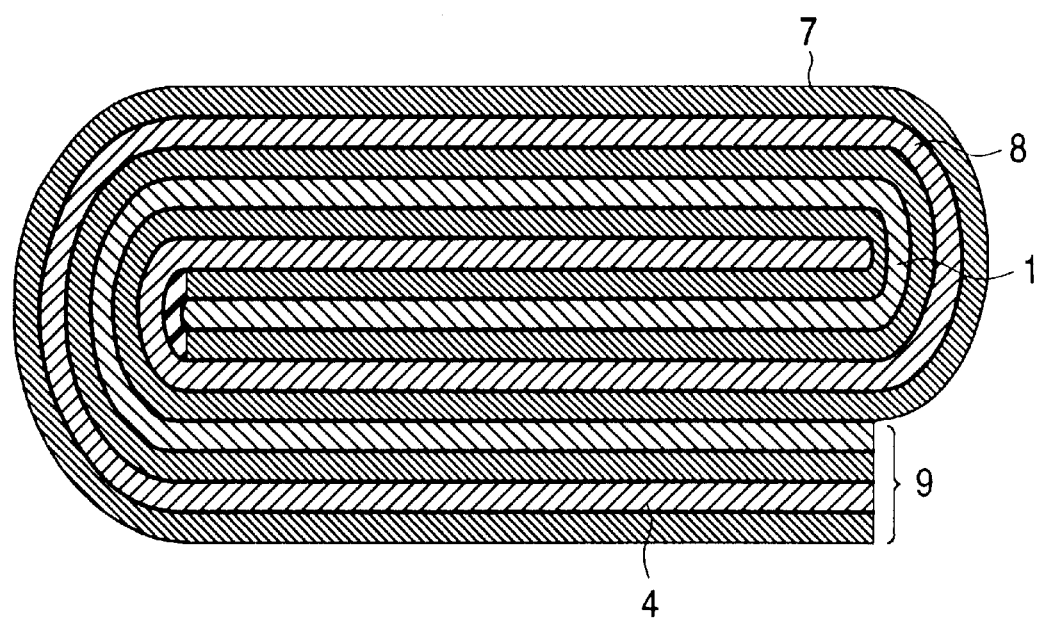
FIG. 4 is a schematic cross section showing the main part of the battery according a fourth example of the present invention.

Conceivable battery structures include not only the structure having a single electrode laminate shown in FIG. 1 which is composed of a couple of electrodes stuck to a separator but multilayer structures, such as a tabular laminate structure shown in FIG. 2 which is composed of a plurality of electrode laminates and tabular roll type structures shown in FIGS. 3 and 4 in which an electrode laminate is rolled up into an oblong ellipsoid. Adhesive strength and high ion conductivity being thus secured, compact multilayer structure batteries having high performance and a large battery capacity can be obtained without requiring a firm battery case.

The present invention will now be illustrated in greater detail with reference to Examples and Comparative Examples, but the present invention is not deemed to be limited thereto. In Examples 1 to 5 and Comparative Examples 1 to 5 batteries basically having the structure illustrated in FIG. 1 were prepared, and the adhesive strength and charge and discharge characteristics of the resulting batteries were measured.

The adhesive strength of the batteries was obtained in terms of 180° peel strength of a test specimen (20 mm×100 mm×0.2 mm) prepared by adhering a positive electrode 1 and a negative electrode 4 to a separator 7 with an adhesive 8. Measurement was made with UTMII-20 manufactured by Toyo Baldwin at a pulling speed of 10 mm/min at 250° C.

Charge and discharge characteristics were measured in accordance with the method described in Denchi Binran Henshu Iinkai (ed.), Denchi Binran, Maruzen (1990) under the following conditions.

Charge: constant current and constant voltage charge
  Cut-off voltage: 4.2 V
Discharge: constant current discharge
  Cut-off voltage: 2.5 V
Battery electrode capacity: 100 mAh
Charging and discharging current: 100 mA
Charge and discharge efficiency (%)=quantity of
  discharged electricity/quantity of charged electricity×
  100

EXAMPLES 1 TO 5 AND COMPARATIVE EXAMPLES 1 TO 5

Preparation of Positive Electrode

Positive electrode active material paste consisting of 87 wt % of $LiCoO_2$, 8 wt % of graphite powder, and 5 wt % of polyvinylidene fluoride was applied with a doctor blade to a coating thickness of 300 μm to form an active material film. A 30 μm thick aluminum net as a positive electrode current collector was placed thereon, and the positive electrode active material paste was again spread on the net with a doctor blade to a thickness of 300 μm. The double-coated aluminum net was allowed to stand in a drier kept at 60° C. for 60 minutes to make the paste layers half-dried. The resulting laminate was lightly rolled to a thickness of 400 μm to prepare a positive electrode 1 having positive electrode active material layers 3 bonded to a positive electrode current collector 2.

Preparation of Negative Electrode

Negative electrode active material paste consisting of 95 wt % of Mesophase Microbead Carbon (a trade name, produced by Osaka Gas Co., Ltd.) and 5 wt % of polyvinylidene fluoride was applied with a doctor blade to a thickness of 300 μm to make an active material film. A 20 μm thick copper net as a negative electrode current collector was placed thereon, and the negative electrode active material paste was again spread thereon with a doctor blade to a thickness of 300 μm. The laminate was allowed to stand in a drier at 60° C. for 60 minutes to make the paste half-dried. The laminate was lightly rolled to a thickness of 400 μm to prepare a negative electrode 4 having negative electrode active material layers 6 bonded to a negative electrode current collector 5.

Preparation of Adhesive

A polyvinylidene fluoride resin (hereinafter abbreviated as PVDF) was added to N-methyl-2-pyrrolidone (hereinafter abbreviated as NMP), and the mixture was heated to 80° C. with stirring to prepare a uniform solution. A prescribed amount of a surface active agent described below was added to the solution, followed by stirring to prepare an adhesive.

Preparation of Specimen for Adhesive Strength Test

The above-prepared adhesive was applied to a porous polypropylene sheet (Cellgluard #2400, produced by Hoechest) used as a separator 7, and the above-prepared positive electrode and negative electrode were stuck thereto to give a prescribed total thickness. The laminate was hot pressed at 80° C. for 1 hour and cut to a prescribed size.

Preparation of Battery

The above-prepared adhesive was applied to both sides of a porous polypropylene sheet (Cellgluard #2400, produced by Hoechest) used as a separator 7, and the positive electrode and the negative electrode were stuck thereto to give a prescribed total thickness. The laminate was hot pressed at 80° C. in vacuo for 1 hour to obtain an electrode laminate. The electrode laminate was put into an aluminum laminate film pack and impregnated with an electrolytic solution consisting of 1 mol/l of lithium hexafluorophosphate in a 1:1 (by weight) mixed solvent of ethylene carbonate anddiethylcarbonateunder reducedpressure, and the pack was heat-sealed to complete a battery having a single layer structure.

Surfactant 1: polysiloxane-polyoxyalkylene copolymer having an HLB value of 1, used in the adhesive of the invention as a surfactant.

Surfactant 2: polysiloxane-polyoxyalkylene copolymer having an HLB value of 4, used in the adhesive of the invention as a surfactant.

Surfactant 3: polysiloxane-polyoxyalkylene copolymer having an HLB value of 9, used in the adhesive of the invention as a surfactant.

Surfactant 4: monoperfluoroalkyl ethylphosphoric ester, used in the adhesive of the invention as a surfactant.

Surfactant 5: polymethoxypolysiloxane, used in the adhesive of the invention as a surfactant.

Surfactant 6: polyethylene glycol monofatty acid ester compound, which is a protic surfactant different from those used in the invention.

Surfactant 7: polyoxyethylene alkylamine compound, which is a protic and basic surfactant different from those used in the invention.

The HLB value is a value indicative of the performance of a surface active agent, which is obtained according to formula (1) shown below as described, e.g., in Hiroshi Horiguchi, Shin-kaimen Kasseizai, Sankyo Shuppan K.K. (1975).

$$HLB = 20 \times (1 - (M'/M)) \quad (1)$$

wherein M: molecular weight of a surface active agent; M': molecular weight of the hydrophobic group in the surface active agent.

TABLE 1

|  |  | PVDF Concn. in Adhesive (wt %) | Added Surfactant | Surfactant Concn. in Adhesive (wt %) | Spread of Adhesive (mg/cm$^2$) | Adhesive Strength | Charge and Discharge Characteristics | |
|---|---|---|---|---|---|---|---|---|
|  |  |  |  |  |  |  | 1st Cycle | 100th Cycle |
| Example | 1 | 5 | surfactant 1 | 0.5 | 3 | good | good | good |
|  | 2 | 5 | surfactant 2 | 0.5 | 3 | good | good | good |
|  | 3 | 5 | surfactant 3 | 0.5 | 3 | good | good | good |
|  | 4 | 5 | surfactant 4 | 0.5 | 3 | good | good | good |
|  | 5 | 5 | surfactant 5 | 0.5 | 3 | good | good | good |

TABLE 1-continued

|  |  | PVDF Concn. in Adhesive (wt %) | Added Surfactant | Surfactant Concn. in Adhesive (wt %) | Spread of Adhesive (mg/cm$^2$) | Adhesive Strength | Charge and Discharge Characteristics | |
|---|---|---|---|---|---|---|---|---|
|  |  |  |  |  |  |  | 1st Cycle | 100th Cycle |
| Compara. Example | 1 | 5 | none | — | 3 | bad | bad | bad |
|  | 2 | 5 | none | — | 6 | good | bad | bad |
|  | 3 | 10 | none | — | 3 | good | bad | bad |
|  | 4 | 5 | surfactant 6 | 0.5 | 3 | good | good | bad |
|  | 5 | 5 | surfactant 7 | 0.5 | 3 | good | good | bad |

The peel adhesive strength of the adhesives as measured on adhesion test specimens prepared in Examples 1 to 5 and Comparative Examples 1 to 5 was evaluated according to the following standard. The results obtained are shown in Table 1 above.

Good The peel strength was 30 gf/cm or greater between positive electrode 1 and separator 7 and between negative electrode 4 and separator 7.

Poor The peel strength was lower than 30 gf/cm between positive electrode 1 and separator 7 and/or between negative electrode 4 and separator 7.

The batteries obtained in Examples 1 to 5 and Comparative Examples 1 to 5 were subjected to a charge and a discharge 100 times. The charge and discharge characteristics in the first and 100th cycles were evaluated according to the following standard. The results are also shown in Table 1.

Good The charge and discharge efficiency was 70% or higher.

Poor The charge and discharge efficiency was lower than 70%, or the battery was impossible to charge and discharge.

As is apparent from Table 1, Examples 1 to 5 provide batteries showing great adhesive strength between the positive electrode 1 and the separator 7 and between the negative electrode 4 and the separator 7 and exhibiting excellent charge and discharge characteristics.

Where no surface active agent was added as in Comparative Example 1, adhesive strength sufficient for joining the positive electrode 1, the separator 7 and the negative electrode 4 into an integral battery body was not obtained although the PVDF concentration and the spread of the adhesive were equal to those in Examples 1 to 5.

As shown in Comparative Example 2, where no surface active agent was added, and the spread of the adhesive was double that in Examples 1 to 5, sufficient adhesive strength was attained, but the charge and discharge characteristics were deteriorated.

As shown in Comparative Example 3, where no surface active agent was added while doubling the PVDF concentration as compared with Examples 1 to 5, sufficient adhesive strength was attained, but the charge and discharge characteristics were deteriorated.

Where a protic compound or a basic compound was used as a surface active agent as in Comparative Examples 4 or 5, deterioration in adhesive strength and charge and discharge characteristics resulted.

EXAMPLE 6

Negative and positive electrodes and an adhesive were prepared in the same manner as in Example 1. The adhesive was applied to a side of two separators, and the negative electrode was inserted in between the coated sides of the two separators and joined together. The laminate was hot pressed at 80° C. in vacuo for 1 hour to evaporate NMP from the adhesive thereby to bond the negative electrode between the two separators.

The pair of the separators having the negative electrode bonded therebetween was punched to obtain a cut piece of a prescribed size. The adhesive was applied to one side of the cut piece, and the positive electrode, cut out to a prescribed size, was stuck thereto to form a laminate composed of the separator, the negative electrode, the separator, and the positive electrode in order. The adhesive was applied to a side of another laminate composed of a pair of separators and another sheet of the negative electrode sandwiched therebetween cut to a prescribed size, and the coated side was stuck to the positive electrode of the previously prepared laminate. The above-described steps were repeated to build up a battery body having a plurality of electrode laminates. The battery body was dried while applying pressure to prepare a tabular laminated battery body as shown in FIG. 2.

A current collector tab was connected to every end of the positive electrode current collectors and the negative electrode current collectors of the resulting tabular laminated battery body, and the current collector tabs were spot welded to establish parallel electrical connections among the positive electrodes and among the negative electrodes. The tabular roll type laminated battery body was put into an aluminum laminate film pack and impregnated with an electrolytic solution in the same manner as in Example 1, and the pack was heat-sealed to complete a battery having a multilayer structure.

Example 6 may be modified in such a manner that the steps of joining the positive electrode in two separators in the same manner as described above, applying the adhesive to a side of the paired separators having the positive electrode therebetween, sticking the negative electrode to the coated side of the paired separators, and sticking another paired separators having the positive electrode therebetween to the thus adhered negative electrode are repeated.

EXAMPLE 7

Negative and positive electrodes and an adhesive were prepared in the same manner as in Example 1. The adhesive was applied to a side of two separators having a band form, and the positive electrode of band form was inserted in between the coated sides of the two separators and joined together. The resulting laminate was hot pressed at 80° C. in vacuo for 1 hour to evaporate NMP from the adhesive thereby to bond the positive electrode between the two separators.

The prepared adhesive was applied to one of the paired separators of band form having the positive electrode therebetween. One end of the paired separators was folded back at a prescribed length with the adhesive-coated side inward, the negative electrode cut to a prescribed size was inserted into the fold, and the folded laminate was passed through a laminator. Subsequently, the adhesive was applied to the other side of the paired separators of band form, and another cut piece of the negative electrode having a prescribed size was stuck thereto at the position facing the negative electrode having been inserted into the fold. The paired separators were rolled by a half turn in such a manner that the negative electrode thus stuck might be wrapped in, making an oblong ellipsoid. The separators were again rolled up with still another cut piece of the negative electrode inserted therein. These steps were repeated to form a battery body having a plurality of electrode laminates. The battery body was dried under pressure to obtain a tabular laminated battery body of roll form as shown in FIG. 3.

Current collector tabs connected to every end of the negative electrode current collectors of the resulting tabular roll type laminated battery body were spot welded to establish parallel electrical connections. The tabular roll type laminated battery body was impregnated with an electrolytic solution and sealed in the same manner as in Example 1to obtain a multilayer secondary battery.

While in Example 7 an example in which a pair of separator bands having a positive electrode of band form joined therebetween is rolled up with a plurality of negative electrodes of prescribed size being each inserted for every half turn has been described, it is possible that a pair of separator bands having a negative electrode of band form joined therebetween is rolled up with a plurality of positive electrodes of prescribed size being each inserted for every half turn.

Further, while Example 7 has shown a method in which the separators were rolled up, it is replaced by a method in which a pair of separator bands having a positive or negative electrode of band form joined therebetween are folded while inserting a cut piece of a negative or positive electrode into every fold.

EXAMPLE 8

Negative and positive electrodes and an adhesive were prepared in the same manner as in Example 1.

The positive electrode of band form was arranged between two separators, and the negative electrode of band form was placed on the outer side of one of the separators with a prescribed length of its starting end sticking out over the end of that separator. The adhesive had previously been applied to the inner side of the paired separators and the outer side of one of the separators on which the negative electrode was to be arranged. The sticking end of the negative electrode was first sent to a laminator, and the negative electrode, the separator, the positive electrode, and the separator were then passed through the laminator to form a laminate of band form. The adhesive was then applied to the outer side of the other separator, and the sticking end of the negative electrode was folded back and stuck to the adhesive-coated surface. The laminate was rolled up in such a manner that the folded negative electrode might be wrapped in to make an oblong ellipsoid to form a battery body having a plurality of electrode laminates as shown in FIG. 4. The battery body was dried under pressure to obtain a tabular roll type laminated battery body. The battery body was impregnated with an electrolytic solution and sealed in the same manner as in Example 1 to complete a battery.

While in the above example the positive electrode of band form was arranged between a pair of separators of band form, and the negative electrode was arranged on one of the separators, the same type of a battery could be prepared by arranging the negative electrode of band form in between the separators of band form and the positive electrode on one of the separators, and rolling up the laminate.

In Examples 6 to 8, when the number of the electrode laminates was varied, the battery capacity increased with the number of the laminates.

The present invention provides batteries which can have reduced size and weight and an arbitrary shape as well as improved performance and can be used in portable electronic equipment, such as portable personal computers and cellular phones.

What is claimed is:

1. A battery comprising:
    at least one electrode laminate comprising:
        a pair of electrodes, each electrode including an active material layer bonded to a current collector;
        a separator sandwiched between said pair of electrodes;
        an adhesive adhering the separator to the active material layer of each of said pair of electrodes;
        wherein said adhesive comprises:
            a thermoplastic resin,
            a solvent capable of dissolving said thermoplastic resin, and
            a neutral and aprotic surface active agent,
    wherein said surface active agent of said adhesive includes polysiloxane skeleton.

2. A battery according to claim 1, wherein said at least one electrode laminate includes a plurality of electrode laminates.

3. A battery according to claim 2, wherein each of said plurality of electrode laminates are formed by interposing a positive electrode and a negative electrode alternately among a plurality of cut sheets of the separator.

4. A battery according to claim 2, wherein each of said plurality of electrode laminates are formed by interposing a positive electrode and a negative electrode alternately between rolled separators.

5. A battery according to claim 2, wherein each of said plurality of electrode laminates are formed by interposing a positive electrode and a negative electrode alternately between folded separators.

6. A battery according to claim 1, wherein said active agent of said adhesive is made of polymethoxypolysiloxane.

7. A battery according to claim 1, wherein said thermoplastic resin of said adhesive is made of any one of polyvinylidene fluoride, polyvinyl alcohol, and mixtures thereof.

8. A battery according to claim 1, wherein said solvent of said adhesive is made of mixed solvent containing at least one of solvents including N-methyl-2-pyrrolidone, N,N-dimethylformamide, N,N-dimethylacetamide, γ-butyrolactone.

* * * * *